United States Patent
Mathiasson et al.

(10) Patent No.: US 10,682,895 B2
(45) Date of Patent: Jun. 16, 2020

(54) VEHICLE AMBIENT AIR PURIFICATION ARRANGEMENT AND METHOD, AND A VEHICLE AND VEHICLE FLEET COMPRISING SUCH ARRANGEMENT

(71) Applicant: VOLVO CAR CORPORATION, Gothenburg (SE)

(72) Inventors: Hans Mathiasson, Torslanda (SE); Lena Lonnqvist, Ljungskile (SE)

(73) Assignee: VOLVO CAR CORPORATION, Gothenburg (CH)

( * ) Notice: Subject to any disclaimer, the term of this patent is extended or adjusted under 35 U.S.C. 154(b) by 479 days.

(21) Appl. No.: 14/666,974

(22) Filed: Mar. 24, 2015

(65) Prior Publication Data

US 2015/0283880 A1    Oct. 8, 2015

(30) Foreign Application Priority Data

Apr. 2, 2014    (EP) .................................... 14163171

(51) Int. Cl.
*B60H 1/00* (2006.01)
*B60H 1/24* (2006.01)
*B60H 3/06* (2006.01)

(52) U.S. Cl.
CPC ..... *B60H 1/00778* (2013.01); *B60H 1/00821* (2013.01); *B60H 1/00828* (2013.01);
(Continued)

(58) Field of Classification Search
CPC ............ B60H 1/00778; B60H 1/00821; B60H 1/00828; B60H 1/24; B60H 3/0633; B60H 3/0658
(Continued)

(56) References Cited

U.S. PATENT DOCUMENTS 5,256,103 A * 10/1993 Abthoff ................ B60H 3/0625
454/139
5,586,448 A    12/1996 Ikeda et al.
(Continued)

FOREIGN PATENT DOCUMENTS

CN    101039812 A    9/2007
CN    101580005 A    11/2009
(Continued)

OTHER PUBLICATIONS

Calvo, Sabine, FR2819451 Translation.pdf, "Vehicle passenger compartment air conditioner and distributor", Jul. 2002, pp. 1-13.*
(Continued)

*Primary Examiner* — Grant Moubry
*Assistant Examiner* — Ryan L Faulkner
(74) *Attorney, Agent, or Firm* — Brooks Kushman P.C.

(57) ABSTRACT

A vehicle ambient air purification arrangement, a vehicle, a vehicle fleet and a method for purifying air ambient to a vehicle are provided. The arrangement comprises an air conveying apparatus and a controller. The controller is arranged to control the air conveying apparatus to convey ambient air through ducts and filters of a ventilation system in response to a determination that an engine is inoperative and that a voltage supplied to the arrangement from an electricity supply source exceeds a threshold voltage.

21 Claims, 4 Drawing Sheets

(52) U.S. Cl.
CPC .............. *B60H 1/24* (2013.01); *B60H 3/0633* (2013.01); *B60H 3/0658* (2013.01); *Y10S 903/904* (2013.01)

(58) Field of Classification Search
USPC .......................................................... 454/75
See application file for complete search history.

(56) References Cited

U.S. PATENT DOCUMENTS

| | | | | |
|---|---|---|---|---|
| 5,681,218 | A | * | 10/1997 | Kishi ................... B60H 3/0085 454/139 |
| 5,704,966 | A | * | 1/1998 | Rohrbach ............ B01D 50/006 261/104 |
| 5,938,523 | A | * | 8/1999 | Khelifa ................ B60H 3/0633 454/156 |
| 6,195,985 | B1 | | 3/2001 | del Re et al. |
| 6,361,579 | B1 | | 3/2002 | Itoh et al. |
| 6,647,712 | B2 | | 11/2003 | Hiller et al. |
| 6,808,450 | B2 | * | 10/2004 | Snow ................ B60H 1/00428 454/137 |
| 7,749,312 | B2 | * | 7/2010 | Takigawa ............... B01D 53/02 454/141 |
| 7,823,399 | B2 | | 11/2010 | Egawa |
| 8,146,376 | B1 | * | 4/2012 | Williams .................. F24F 1/00 62/157 |
| 8,282,706 | B2 | * | 10/2012 | Leustek ................. F01N 9/002 55/385.3 |
| 9,416,746 | B2 | * | 8/2016 | Harmsen ................ F02D 41/30 |
| 9,638,078 | B2 | | 5/2017 | Mathiasson et al. |
| 9,649,912 | B2 | * | 5/2017 | Loup ..................... B60H 3/0633 |
| 9,725,099 | B2 | * | 8/2017 | Gallagher ................. B61C 5/00 |
| 10,232,684 | B2 | * | 3/2019 | Tajima ............... B01D 53/0462 |
| 2002/0056373 | A1 | * | 5/2002 | Fielding ............. B01D 53/0476 96/108 |
| 2004/0149129 | A1 | * | 8/2004 | Petersson ............... B01D 53/04 95/148 |
| 2005/0217487 | A1 | * | 10/2005 | Fielding ............... B60H 3/0633 96/121 |
| 2006/0277675 | A1 | * | 12/2006 | Tinnell .................. E04H 1/1216 4/477 |
| 2007/0204601 | A1 | | 9/2007 | Ishii et al. |
| 2007/0221370 | A1 | | 9/2007 | Allen et al. |
| 2009/0038301 | A1 | | 2/2009 | Oi |
| 2009/0165479 | A1 | | 7/2009 | Lin et al. |
| 2009/0286459 | A1 | | 11/2009 | Major et al. |
| 2010/0132388 | A1 | | 6/2010 | Oyobe et al. |
| 2011/0046828 | A1 | * | 2/2011 | Chander .................. B60L 1/003 701/22 |
| 2011/0072799 | A1 | * | 3/2011 | Bidner .................... F01N 3/023 60/286 |
| 2012/0117946 | A1 | * | 5/2012 | Gonze .................. F01N 3/0231 60/274 |
| 2012/0227382 | A1 | | 9/2012 | Bidner et al. |
| 2013/0046424 | A1 | * | 2/2013 | Gallagher ................. B61C 5/00 701/19 |

FOREIGN PATENT DOCUMENTS

| | | | | |
|---|---|---|---|---|
| CN | 101687457 | A | | 3/2010 |
| CN | 102971165 | A | | 3/2013 |
| CN | 103625245 | A | | 3/2014 |
| EP | 1378642 | A1 | | 1/2004 |
| FR | 2819451 | A1 | * | 7/2002 .......... B60H 3/0633 |
| FR | 2976856 | A1 | | 12/2012 |
| JP | 2006168681 | A | * | 6/2006 |
| WO | 2007023340 | A1 | | 3/2007 |

OTHER PUBLICATIONS

Mizutani, Satoshi, JP2006168681 Translation.pdf, "Air Conditioner for Vehicle", Jun. 2006, pp. 1-23.*
Extended European Search Report dated Sep. 25, 2014, Application No. 14163171.3-1756, Applicant Volvo Car Corporation, 5 Pages.
Patent Application U.S. Appl. No. 14/666,776, filed Mar. 24, 2015, 24 Pages.
Extended European Search Report dated Sep. 18, 2014, Application No. 14163170.5-1606, Applicant Volvo Car Corporation, 7 Pages.
U.S. Office Action dated May 4, 2016, U.S. Appl. No. 14/666,776, 27 Pages.
Barry Dalgleish, "Air Pollution—A Silent Killer", Dated Feb. 19, 2014, https://sites.google.com/site/foeglasgow/home/blog/airpollution-asilentkiller, 9 Pages.
U.S. Advisory Action dated Nov. 22, 2016, U.S. Appl. No. 14/666,776, 6 Pages.
U.S. Notice of Allowance dated Jan. 19, 2017, U.S. Appl. No. 14/666,776, 10 Pages.
U.S. Final Office Action dated Aug. 19, 2016, U.S. Appl. No. 14/666,776, 21 Pages.
Chinese Office Action dated Jun. 21, 2018, Application No. 201510134764.4, 7 Pages.
Chinese Second Office Action dated Jan. 18, 2019, Application No. 201510134764.4, 8 Pages.
Reference D4: "Principles and Maintenance of Automotive Air Conditioning Systems", Liu Chunhui et al., pp. 137-138, Mechanical Industry Press 1st Edition, (including English Translation of pp. 137-138—Chapter IV: Heating, Ventilation and Gas Distribution System for Automotive Air Conditioning), 7 Pages.
Chinese Third Office Action dated May 10, 2019, Application No. 201510134764.4, Applicant Volvo Car Corporation, 8 Pages.
English Machine Translation of Chinese First Office Action dated Jun. 21, 2018, Application No. 201510134764.4, Applicant Volvo Car Corporation, 9 Pages.
Chinese Search Report dated Jun. 21, 2018, Application No. 201510134764.4, 2 Pages.
Chinese Supplementary Search Report dated Apr. 29, 2019, Application No. 201510134764.4, 2 Pages.
Chinese Notification to Grant Patent Right for Invention dated Sep. 12, 2019, Application No. 201510134764.4, 1 Page.

* cited by examiner

VEHICLE AMBIENT AIR PURIFICATION ARRANGEMENT AND METHOD, AND A VEHICLE AND VEHICLE FLEET COMPRISING SUCH ARRANGEMENT

CROSS-REFERENCE TO RELATED APPLICATIONS

This application claims foreign priority benefits under 35 U.S.C. § 119(a)-(d) to European patent application number EP 14163171.3, filed Apr. 2, 2014, which is incorporated by reference in its entirety.

TECHNICAL FIELD

Embodiments herein relate to a vehicle ambient air purification arrangement and to a vehicle comprising a vehicle ambient air purification arrangement. Embodiments herein also relate to a fleet of vehicles, wherein each vehicle in the fleet comprises a vehicle ambient air purification arrangement. Embodiments herein further relate to a method for purifying air ambient to a vehicle.

BACKGROUND

Air pollution in form of particulates is a major concern in the world today and the amount of particulates in the air is increasing in many places. Some particulates occur naturally in the air, originating e.g., from volcanos, dust storms and forest/grassland fires. Some particulates are caused by human activities, such as burning of fossil fuel and industrial processes. Increased levels of particulates in the air are linked to several health hazards.

The levels of particulates in the air may be particularly high in large cities with many inhabitants, vehicles and industries. Legislation in some countries relates both to the emission allowed for a certain type of pollution and for the ambient concentration of particulates. For example, the European Union has established the European emission standards, which include limits for particulates in the air. Particles with a diameter of 10 micrometers or less are often referred to as PM10 and particles with a diameter of 2.5 micrometers or less are often referred to as PM2.5.

Due to the health effects of particulate matters, many attempts to reduce the amount of particulates in the air have been made. However, it is still desirable to further reduce the amount of particulates in the air.

SUMMARY

Embodiments herein aim to provide a vehicle ambient air purification arrangement which reduces the amounts of particulates in the air.

According to an embodiment, this is provided by a vehicle ambient air purification arrangement in a vehicle comprising an engine and a ventilation system having ducts and one or more filters therein for purification of ambient air that flows to a passenger compartment of the host vehicle, wherein the arrangement comprises: an air conveying apparatus and a controller, where the controller further is arranged to control the air conveying apparatus to convey ambient air through the ducts and filters of the ventilation system in response to a determination that the engine is inoperative and that a voltage supplied to the arrangement from an electricity supply source exceeds a threshold voltage.

Since the controller is arranged to control the air conveying apparatus to convey ambient air through the ducts and filters of the ventilation system in response to a determination that the engine is inoperative and that a voltage supplied to the arrangement from an electricity supply source exceeds a threshold voltage, ambient air is purified by the arrangement when the engine is shut off and electricity is supplied to the arrangement.

Thus, when the vehicle is parked and has access to electricity, the air conveying apparatus convey ambient air through one or more filters in order to collect air particulates, soot, etc., in the one or more filters. The vehicle ambient air purification arrangement acts as a pollution reduction device when the vehicle is parked.

The ambient air which has passed the arrangement therefore has a significantly lower amount of particulates than air which has not passed the arrangement. Thanks to this arrangement, the filters can collect particulates from the air, not only when the vehicle is driven, but also when the vehicle is parked. Since many vehicles are parked more than they are driven, the filters may be actively used for a considerably larger amount of time compared to arrangements which purify e.g., air to a vehicle compartment only when the vehicle is driven.

Thus, hereby is provided a vehicle ambient air purification arrangement, reducing the shortcomings and/or drawbacks associated with prior art solutions.

According to some embodiments, the controller further is arranged to determine if the electricity supply source is a power grid, and still further arranged to activate the air conveying apparatus if it is determined that the arrangement is connected to this power grid.

Since the controller further is arranged to determine if the electricity supply source is a power grid, and still further arranged to activate the air conveying apparatus if it is determined that the arrangement is connected to this power grid, it is ensured that the vehicle ambient air purification arrangement receives sufficient electricity to function properly.

According to some embodiments, the controller is connected to an electric hybrid system comprising at least one battery which is chargeable via a power grid, and in that the controller is arranged to activate the air conveying apparatus if it is determined that the at least one battery is being charged.

Since the controller is connected to an electric hybrid system comprising at least one battery which is chargeable via a power grid, and in that the controller is arranged to activate the air conveying apparatus if it is determined that the at least one battery is being charged, the electricity from the power grid is simultaneously used both to charge the vehicle battery and to provide the ambient air purification arrangement with electricity. A user that arranges the vehicle to be charged therefore simultaneously allows the ambient air purification arrangement to be activated. Thus, no additional effort from the user is necessary. The electric hybrid system may at least partly be comprised in the host vehicle, and the battery may be charged via a plug-in system, i.e., where the battery is charged via cable, or cable-free, e.g., via induction.

According to some embodiments, the controller is connected to an electric hybrid system comprising at least one of a solar power generator, arranged to convert solar energy into electrical energy and a wind power generator which is arranged to convert wind energy into electrical energy, and at least one battery which is chargeable via the power generator. The controller is arranged to activate the air conveying apparatus if it is determined that the at least one battery is being charged.

Since the controller is arranged to activate the air conveying apparatus if it is determined that the at least one battery is being charged via the power generator, solar energy and/or wind energy is used to provide the ambient air purification arrangement with electricity. Hereby an environmental net gain is further enhanced.

According to some embodiments, the ventilation system further comprises at least one air intake and at least one air outlet, and the air conveying apparatus and a particulate filters are arranged between the at least one air intake and the at least one air outlet. The controller is arranged to control the air conveying apparatus to convey the ambient air through the ventilation system, from the at least one air intake to the at least one air outlet, through the particulate filter. The particulate filter is configured to collect at least a part of the particles in the ambient air when the ambient air is conveyed through the particulate filter.

Since the controller is arranged to control the air conveying apparatus to convey the ambient air through the ventilation system from the at least one air intake to the at least one air outlet through the particulate filter, the particulate filter can collect at least a part of the particles in the ambient air when the ambient air is drawn through the particulate filter. The air intake may be an existing ventilation system intake or an intake separated from any existing ventilation system intakes. The at least one air outlet may be an existing ventilation system outlet or an outlet separated from any existing ventilation system outlets.

According to some embodiments, the arrangement further comprises regeneration means, configured to regenerate the particulate filter by at least one of:
heat regeneration,
electrical regeneration,
UV-light regeneration.

Since the regeneration means are configured to regenerate the particulate filter by at least one of; heat regeneration, electrical regeneration, and UV-light regeneration, the particulate filter may be regenerated in an efficient manner.

According to some embodiments, the arrangement further comprises a separate dedicated particle separator arranged between the air intake and the one or more filters.

Since the arrangement further comprises a separate particle separator arranged between the air intake and the one and more filters, some particles may be separated from the incoming ambient air before reaching the one or more filters. For example, a particle separator arranged as an air filter, cyclone and/or centrifuge may separate particles such as sand and dust before they reach a regenerable particulate filter. Hereby sand and other non-regenerable objects are prevented from reaching the regenerable particulate filter.

According to some embodiments, the arrangement further comprises a valve arranged after the one or more filters, where the controller further is arranged to selectively control the valve to let the ambient air from the one or more filters to the host vehicle passenger compartment or to a duct which is arranged to bypass the host vehicle passenger compartment.

Since the controller is arranged to selectively control the valve to let the ambient air flow from the one or more filters to the host vehicle passenger compartment or to a duct which is arranged to bypass the host vehicle passenger compartment an efficient arrangement is achieved. The valve may be arranged to let the ambient air flow via the passenger compartment when the vehicle is driven and via the bypass duct when the vehicle is parked. Hereby the ambient air is kept separated from the passenger compartment when the arrangement is purifying air ambient in a parked vehicle.

In some embodiments the controller may be arranged to alternatively control the valve to let ambient air flow via the bypass duct and via the passenger compartment. Hereby air in the passenger compartment may be changed from time to time such that the passenger compartment air is fresh when a user enters a vehicle that has been parked for a period of time. According to some embodiments the valve may be arranged to control a part of the air from the filter to the passenger compartment and a part of the air from the filter to the bypass duct.

Embodiments herein also aim to provide a vehicle comprising a vehicle ambient air purification arrangement which reduces the amounts of particulates in the air.

According to some embodiments, this is provided by a vehicle comprising a vehicle ambient air purification arrangement according to embodiments disclosed herein.

Since the vehicle comprises a vehicle ambient air purification arrangement according to embodiments disclosed herein, the amounts of particulates in the air is reduced.

Thus, hereby is provided a vehicle which reduces the amounts of particulates in the air.

Embodiments herein also aim to provide a vehicle fleet comprising a plurality of vehicles which reduce the amounts of particulates in the air.

According to some embodiments, this is provided by a vehicle fleet comprising a plurality of vehicles according to embodiments described herein.

Since the vehicle fleet comprises a plurality of vehicles according to embodiments described herein, the amount of particulates in the air is reduced. A fleet of vehicles, in which each vehicle is equipped with an air purification arrangement, is capable of considerably reducing the amount of particles in an area where the vehicle fleet is parked.

Embodiments herein also aim to provide a method for purifying air ambient to a vehicle without the shortcomings or drawbacks described above.

According to some embodiments, this is provided by a method for purifying air ambient to a vehicle by a vehicle ambient air purification arrangement in a vehicle comprising an engine and a ventilation system having ducts and one or more filters therein for purification of ambient air that flows to a passenger compartment of the host vehicle wherein the arrangement comprises an air conveying apparatus and a controller, and where the method comprises:
determining, by the controller, that the engine is inoperative,
determining, by the controller, that a voltage supplied to the arrangement from an electricity supply source exceeds a threshold voltage,
controlling the air conveying apparatus to convey ambient air through the ducts and filters of the ventilation system in response to a determination that the engine is inoperative and that a voltage supplied to the arrangement exceeds a threshold voltage.

Since the method comprises: determining that the engine is inoperative, determining that a voltage supplied to the arrangement exceeds a threshold voltage and controlling the air conveying apparatus to convey ambient air through the ducts and filters of the ventilation system in response to a determination that the engine is inoperative and that a voltage supplied to the arrangement exceeds a threshold voltage, ambient air is efficiently purified by the method.

Further features of, and advantages with, the embodiments herein will become apparent when studying the appended claims and the following detailed description.

BRIEF DESCRIPTION OF THE DRAWINGS

The various aspects of embodiments herein, including its particular features and advantages, will be readily understood from the following detailed description and the accompanying drawings, in which.

DETAILED DESCRIPTION

As required, detailed embodiments are disclosed herein. However, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

Embodiments herein will now be described more fully with reference to the accompanying drawings, in which exemplifying embodiments are shown. Like numbers refer to like elements throughout. Well-known functions or constructions will not necessarily be described in detail for brevity and/or clarity.

Figure 1:
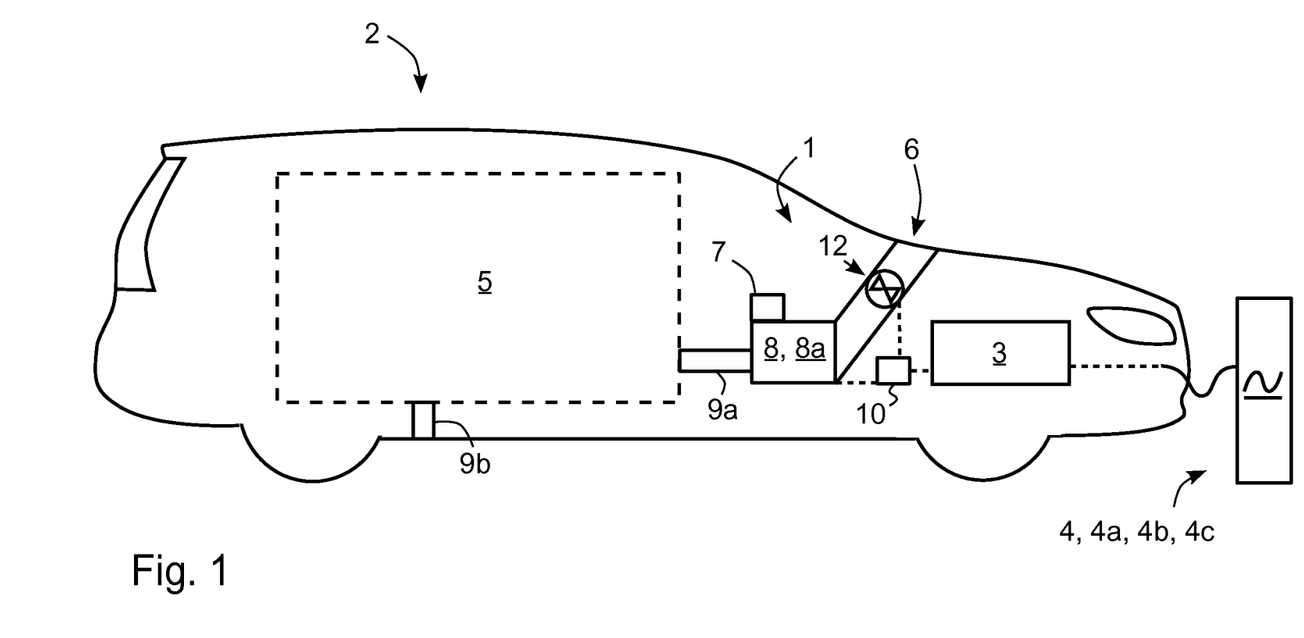
FIG. 1 illustrates a vehicle and a vehicle ambient air purification arrangement according to some embodiments.

FIG. 1 illustrates a vehicle ambient air purification arrangement 1 according to some embodiments. The arrangement 1 is arranged in a vehicle 2 equipped with an engine 3. The engine 3 may be a mechanical engine/motor, an electrical engine/drivetrain or a combination thereof. According to some embodiments the vehicle 2 or any system thereof is arranged to be connected to an electrical supply source 4, such as a power grid. If the vehicle 2 is an electric hybrid vehicle with batteries, such batteries may be charged via the electrical supply source 4. In FIG. 1 the vehicle 2 is supplied with electricity from the electrical supply source 4 via a cable, but in other embodiments the vehicle 2 may be supplied with electricity e.g., by induction. In some embodiments the electricity supply source 4 may be a power generator, possibly driven by solar energy and/or wind energy. Such power generator may be arranged in or on the host vehicle 2.

In FIG. 1 a passenger compartment 5 is illustrated. The passenger compartment 5 may accommodate a vehicle driver and vehicle passengers. A ventilation system of the vehicle 2 is arranged to provide the passenger compartment 5 with ambient air. Filters arranged within ducts of the ventilation system may purify the air before the air is introduced in the passenger compartment 5. An air intake 6 arranged near a windshield is illustrated. One or more air intakes 6 may be arranged e.g., in a front part of the vehicle 2, such as near a vehicle windshield, grille, bonnet or the like.

The arrangement 1 comprises a controller 10 and an air conveying apparatus 12. The controller 10 is directly or indirectly connected to the air conveying apparatus 12 and the vehicle engine 3.

The controller 10 is configured to determine if the engine 3 is operative or not. The controller 10 is also configured to determine if a voltage supplied to the vehicle ambient air purification arrangement 1 exceeds a threshold voltage.

The controller 10 may comprise or be connected to one or more processors, integrated circuits, memory units, sensors, voltage detectors and/or communication arrangements, such that the controller 10 can determine a voltage supplied to the vehicle ambient air purification arrangement 1 and a combustion engine 3 status. For example, the controller 10 may be connected to an engine control module and/or a powertrain control module. Hereby signals indicative of an engine status may be communicated between the engine 3 and the controller 10.

A voltage exceeding a threshold voltage may be supplied e.g., if the vehicle 2 or the arrangement 1 is supplied with electricity from an electricity supply source 4. Such electricity supply source may be a power grid 4a, a power generator of any kind and/or a battery.

The air conveying apparatus 12 may be configured as a pump or air-fan of any kind. The air conveying apparatus 12 may alternatively be arranged in form of a mechanical or electrical compressor. Any means suitable for drawing/pushing/conveying air through the ducts and filters 8 may be used.

The controller 10 is arranged to control the air conveying apparatus 12 to convey ambient air through the ducts and filters 8 of the ventilation system in response to a determination that the engine 3 is inoperative and that a voltage supplied to the arrangement 1 from the electricity supply source 4 exceeds a threshold voltage. Hereby the vehicle ambient air purification arrangement 1 is arranged to purify the air ambient to a vehicle 2, e.g., when the vehicle 2 is parked. The controller 10 may be configured to control the air conveying apparatus 12 to convey ambient air through the filters 8 continuously or discontinuously. For example, the controller 10 may be configured to activate the air conveying apparatus 12 to convey ambient air as long as electricity is supplied or in pre-determined cycles. In some embodiments the ambient air purification arrangement 1 comprises detection means, arranged to detect the amount of particulates in the ambient air. The controller 10 may then control the air conveying apparatus 12 to convey ambient air through the ducts and filter/filters 8 when it is detected that the amount of particulates in the ambient air exceeds a threshold amount of particulates.

Ambient air may, via the air intake 6, be conveyed into the ducts of the ventilation system by the air conveying apparatus 12. At least a part of particulates in the air is collected in the filter 8. In the FIG. 1 embodiment, the air is then led to the passenger compartment 5 via a first air outlet 9a. The air may then be led out from the passenger compartment of the vehicle 2, via one or more second air outlets 9b. Hereby air in the passenger compartment 5 may be changed from time to time, such that the passenger compartment air is fresh when a user enters a vehicle that has been parked for a period of time.

In some embodiments, the controller 10 is arranged to activate the air conveying apparatus 12 if it is determined that the arrangement 1 is connected to the power grid 4a. In other embodiments the controller 10 is connected to an electric hybrid system, comprising at least one battery which is chargeable via the power grid 4a. The controller 10 may then be arranged to activate the air conveying apparatus 12 if it is determined that the at least one battery is being charged.

According to some embodiments, the controller 10 is connected to an electric hybrid system comprising a solar power generator 4b, arranged to convert solar energy into electrical energy. The solar power generator 4*b* may comprise or be connected to solar panels/solar cells. According to some embodiments, the controller 10 is connected to an electric hybrid system comprising a wind power generator 4*c*, which is arranged to convert wind energy into electrical energy. The wind power generator 4*c* may comprise or be connected to one or more parts that may be put in motion by the wind such that electricity will be generated by that motion. A power generator 4*b*, 4*c*, solar panels and/or wind engaging means may be arranged on the host vehicle 2. Alternatively, the host vehicle 2 may be connected to a power generator 4*b*, 4*c*, solar panels and/or wind engaging means arranged separated from the host vehicle 2.

The electric hybrid system may comprise at least one battery which is chargeable via the power generator. The controller 10 may then activate the air conveying apparatus 12 if it is determined that the at least one battery is being charged.

One or more filters 8 may be arranged in a duct of the ventilation system, such that ambient air may be purified when passing the filter 8. A filter 8 may, for example, comprise one or more layers of coarse glass fibers, coated animal hair, vegetable fibers, synthetic fibers or foams, metallic wools, expanded metals or foils. The filter 8 is arranged to catch at least a part of the particles in air passing the filter 8. The filter 8 may be treated with a viscous substance, such as oil, that causes particles to stick to the fibers. A filter 8 may also comprise active carbon or the like, for removal of odors, gases etc. The filter 8 may also be made of electrostatically charged material such as resin wool, plastic film or an electrostatically sprayed polymer.

According to some embodiments, the filter 8 may be a particulate filter 8*a*, such as a ceramic particulate filter. The particulate filter may for example be made of a ceramic substrate such as Aluminum Titanate (TiAl2O5), Silicone Carbide (SiC), Cordierite, Silicon Nitride and/or Acicular Mullite. The particulate filter may be treated with a coating, such as a coating made of an inert metal. For example, the coating may comprise a platinum-group-metal. Hereby catalytic regeneration of the particulate filter may be facilitated. The particulate filter 8*a* may be arranged with a honeycomb-like structure with alternate passages blocked. The particulate filter 8*a* may also be arranged as a "flow through"-filter, in which particulates may be collected in small pockets in walls within the filter.

The particulate filter 8*a* may comprise pores through which air may flow. Filtration properties may depend on the physical layout of the particulate filter 8*a* and on the size of the pores. Particulates may also be referred to as fine particles, particulate matter and/or atmospheric particulate matters. Particles with a diameter of 10 micrometers or less are often referred to as PM10 and particles with a diameter of 2.5 micrometers or less are often referred to as PM2.5 or "fine particles". Sources of fine particles include all types of combustion, including combustion engine vehicles, power plants, residential wood burning, forest fires, agricultural burning, industrial processes etc. Some filters may catch particulates with a particulate size of e.g., of a few micrometers or nanometers.

The particulate filter 8*a* may be arranged as a regenerable particulate filter 8*a*. Hereby the particulate filter 8*a* may be regenerated from soot, particulates, etc.

According to some embodiments the arrangement 1 comprises regeneration means 7 which is configured to regenerate the particulate filter 8*a*. The regeneration means 7 may for example be arranged as a burner, which is arranged to heat up the particulate filter 8*a* or the air flowing through the particulate filter to a particulate combustion temperature. The regeneration means 7 may alternatively supply electricity through the particulate filter 8*a*, such that soot and particulates are heated up and combusted. In some embodiments UV-light from a light source is arranged to clean the particulate filter 8*a* from particulates.

Figure 2:
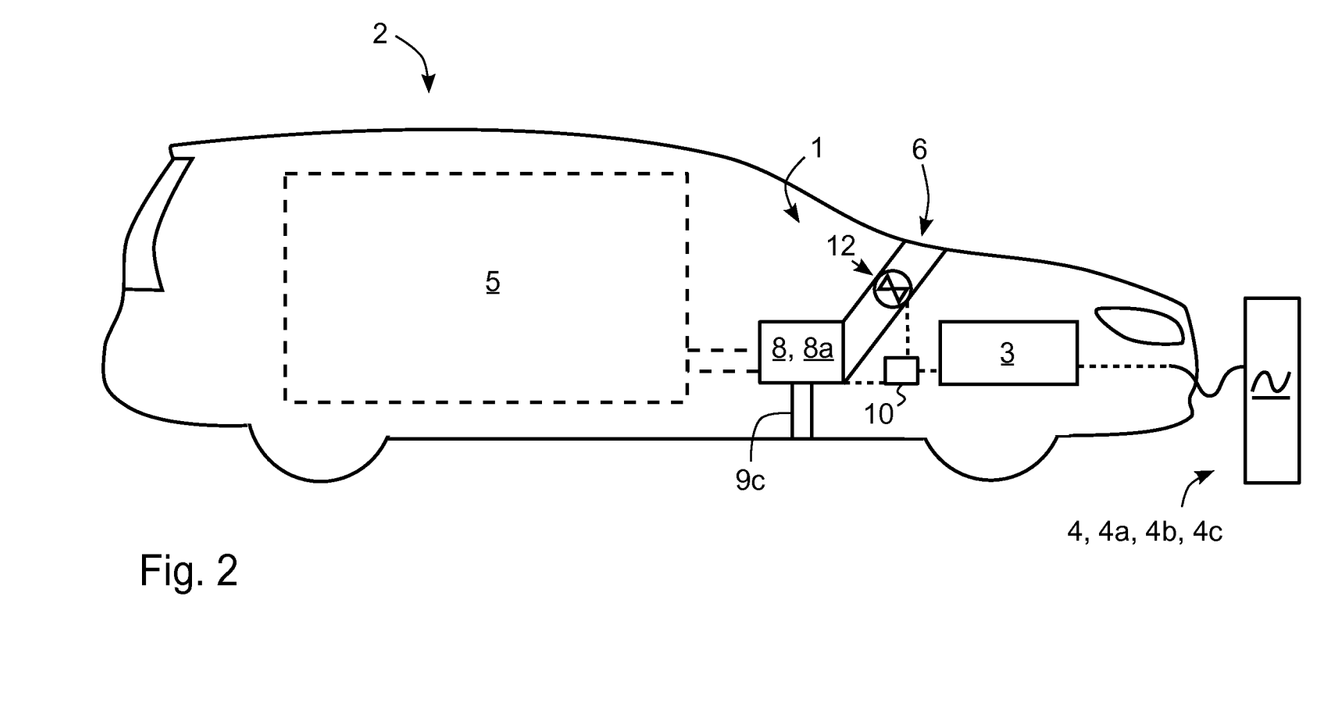
FIG. 2 illustrates a vehicle and a vehicle ambient air purification arrangement according to some other embodiments.

FIG. 2 illustrates a vehicle ambient air purification arrangement 1 according to an alternative embodiment. The arrangement 1 is arranged in a vehicle 2 equipped with an engine 3.

In the FIG. 2 depicted embodiment the arrangement 1 comprises a third air outlet 9*c* which is separated from the air outlet 9*a* to the passenger compartment illustrated in FIG. 1. The third air outlet 9*c* is arranged to lead air which has passed the filter 8 out of the vehicle 2 without first passing the passenger compartment 5. Thanks to the third air outlet 9*c* ambient air can be purified from particulates without first being introduced into the passenger compartment 5.

Figure 3:
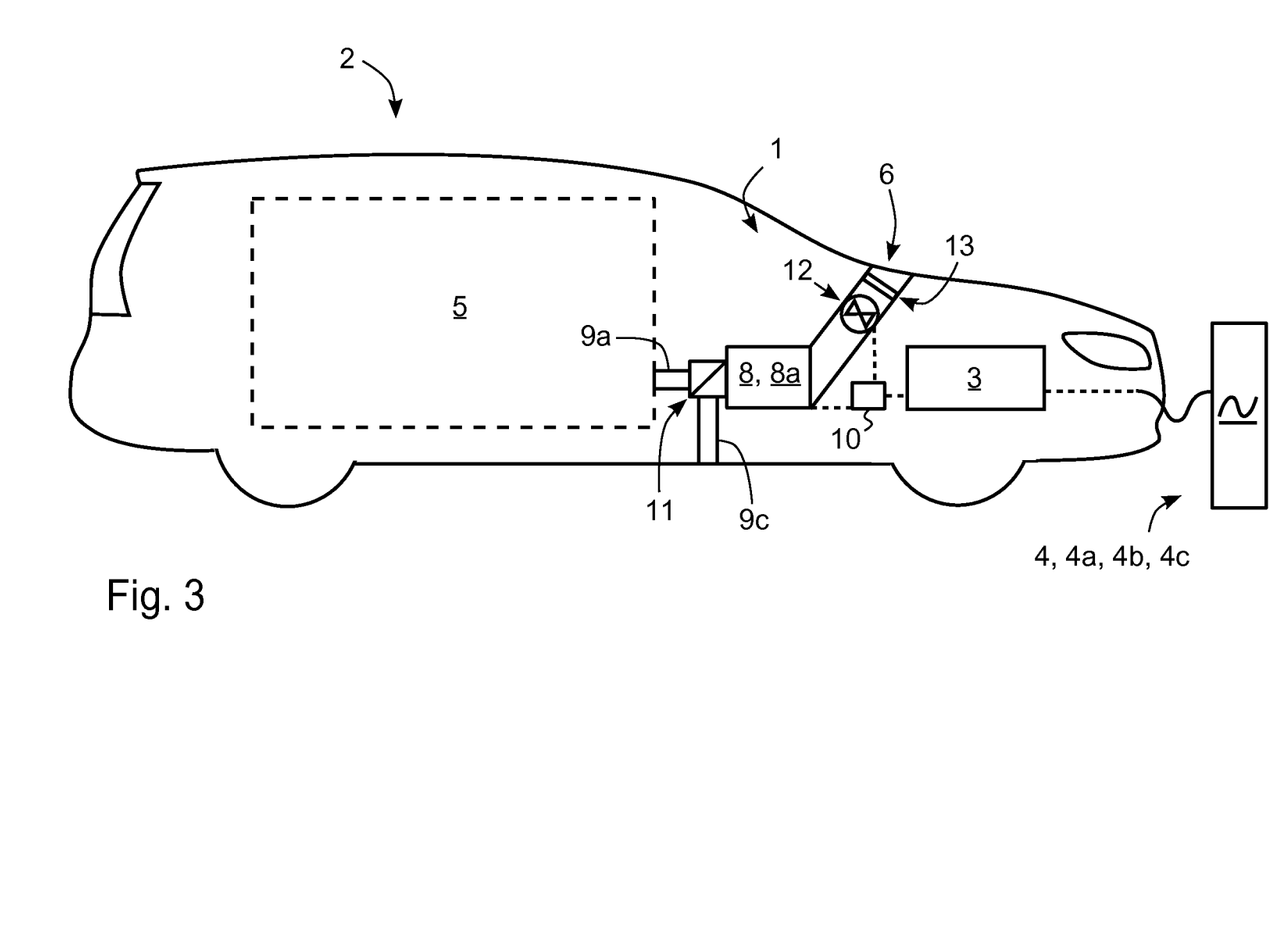
FIG. 3 illustrates a vehicle and a vehicle ambient air purification arrangement according to some further embodiments.

In FIG. 3 a vehicle ambient air purification arrangement 1 according to some embodiments is illustrated. The arrangement 1 is arranged in a vehicle 2 equipped with an engine 3.

In the FIG. 3 embodiment the arrangement 1 further comprises a valve 11 arranged after the one or more filters 8, i.e., downstream of the one or more filters 8 when ambient air is conveyed from the air intake 6 towards one or more outlets.

The controller 10 is arranged to selectively control the valve 11 to let the ambient air from the one or more filters 8 flow to the host vehicle passenger compartment 5 or to a duct which is arranged to bypass the host vehicle passenger compartment 5. The bypass duct may generally correspond to the third air outlet 9*c*, described in the FIG. 2 embodiment. The duct leading to the passenger compartment 5 may generally correspond to the first outlet 9*a*, described in the FIG. 1 embodiment.

The valve 11 may be arranged to let the ambient air flow via the passenger compartment 5 when the vehicle is driven and via the bypass duct when the vehicle is parked. In some embodiments the controller 10 may be arranged to alternatively control the valve 11 to let ambient air flow via the bypass duct and via the passenger compartment 5. According to some embodiments the valve 11 may be arranged to control a part of the air from the filter 8 to flow to the passenger compartment 5 and a part of the air from the filter 8 to flow to the bypass duct. Hereby air in the passenger compartment 5 may be changed from time to time, such that the passenger compartment air is fresh when a user enters a vehicle that has been parked for a period of time.

According to some embodiments the arrangement 1 may further comprises a separate dedicated particle separator 13, arranged between the air intake 6 and the filter 8. The separate dedicated particle separator 13 may, for example, be arranged within a portion of the air intake 6 or arranged in a duct between the air intake 6 and a the air conveying apparatus 12. The separate dedicated particle separator 13 may collect some particles in the air before they are conveyed into the ducts and filters 8 of the arrangement 1. The particle separator 13 may be arranged as an air filter, cyclone and/or centrifuge which may separate particles such as sand and dust before they reach e.g., a regenerable particulate filter 8*a*. Hereby sand and other non-regenerable objects are prevented from reaching the regenerable particulate filter 8*a*.

Figure 4:
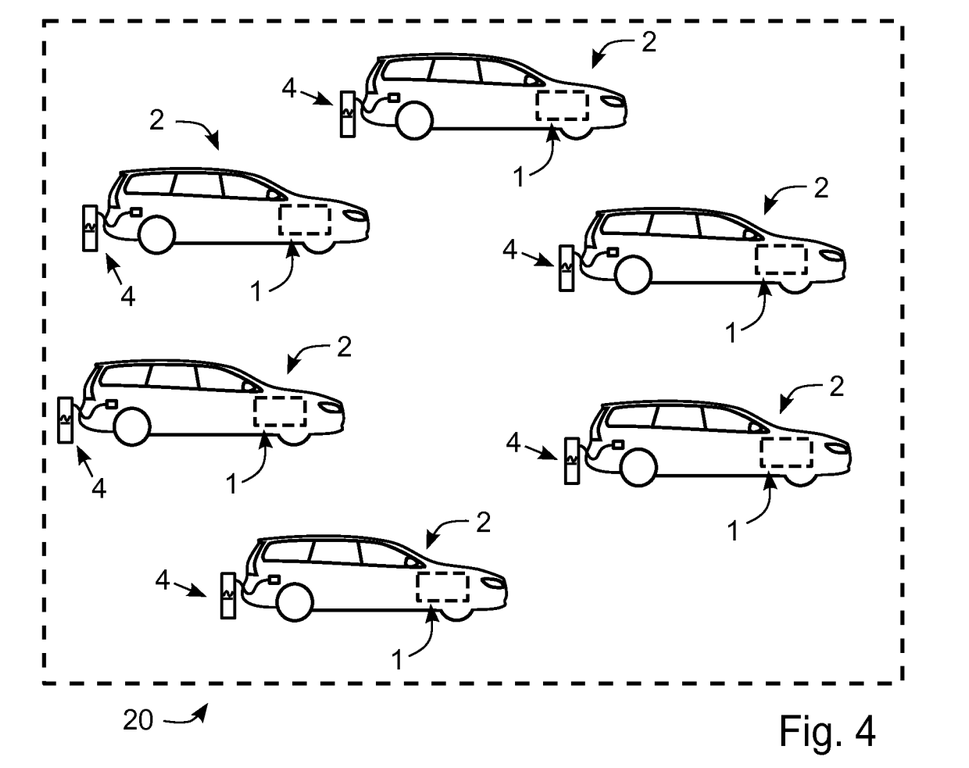
FIG. 4 illustrates a vehicle fleet with a plurality of vehicles, each comprising a vehicle ambient air purification arrangement.

FIG. 4 illustrates a vehicle fleet 20 arranged to clean air which is ambient to the vehicles 2 within the vehicle fleet 20. The vehicle fleet 20 comprises a plurality of vehicles 2 each equipped with a vehicle ambient air purification arrangement 1 according to embodiments described herein. The vehicles 2 within the vehicle fleet 20 may collectively purify air in an area such as a street, neighborhood, city or country. Controllers in the vehicles may be connected to a common server or the like, such that a status of the controllers can be monitored and/or changed. Hereby vehicle ambient air purification arrangements 1 in vehicles 2 within the vehicle fleet 20 may be remotely controlled.

Figure 5:
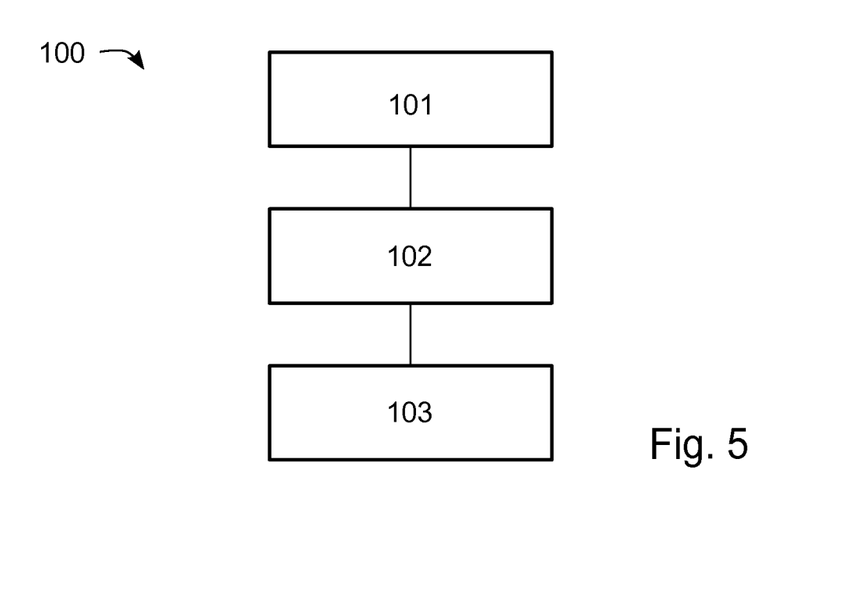
FIG. 5 illustrates a method for purifying air ambient to a vehicle.

FIG. 5 illustrates a method 100 method for purifying air ambient to a vehicle by a vehicle ambient air purification arrangement. The vehicle ambient air purification arrangement is comprised in a vehicle with an engine and a ventilation system having ducts and one or more filters therein for purification of ambient air that flows to a passenger compartment of the host vehicle. The arrangement comprises an air conveying apparatus and a controller.

The method comprises: determining 101, by the controller, that the engine is inoperative, determining 102, by the controller, that a voltage supplied to the arrangement from an electricity supply source exceeds a threshold voltage and controlling 103 the air conveying apparatus to convey ambient air through the ducts and filters of the ventilation system in response to a determination that the engine is inoperative and that a voltage supplied to the arrangement exceeds a threshold voltage.

Although the aspects has been described with reference to non-limiting embodiments, many different alterations, modifications and the like will become apparent for those skilled in the art. For example, a valve 11, as described for the FIG. 3 embodiment, may be included in other disclosed embodiments. A dedicated particle separator 13, as described for the FIG. 3 embodiment, may be used in any of the other above described embodiments. A particulate filter 8a and/or another type of filter 8 may be used in any one of the above described embodiments. Additionally, other features of various implementing embodiments may be combined to form further embodiments of the invention.

What is claimed is:

1. A vehicle ambient air purification arrangement for use in a host vehicle including an engine and a ventilation system having ducts and one or more filters therein for purification of ambient air that flows to a passenger compartment of the host vehicle, as well as ambient air that flows to the host vehicle without entering the passenger compartment, wherein the ventilation system further includes an air outlet for allowing air to pass from the vehicle, the vehicle ambient air purification arrangement comprising:
   an air conveying apparatus;
   a particulate detector configured to detect amount of particulates in ambient air; and
   a controller to activate the air conveying apparatus to convey ambient air through the ducts and the one or more filters of the ventilation system in response to a determination that 1) the engine is inoperative, 2) a voltage supplied to the arrangement from an electricity supply source exceeds a threshold voltage, and 3) the detected amount of particulates in the ambient air exceeds a threshold amount of particulates, so that the one or more filters may purify the ambient air by removing particulates from the ambient air and so that the ambient air may be lead out of the vehicle through the air outlet without first passing through the passenger compartment.

2. The vehicle ambient air purification arrangement according to claim 1 wherein the controller further is configured to determine if the electricity supply source is a power grid, and to activate the air conveying apparatus if it is determined that the arrangement is connected to the power grid.

3. The vehicle ambient air purification arrangement according to claim 1 wherein the controller is connectable to an electric hybrid system comprising at least one battery that is chargeable via a power grid, wherein the electricity supply source comprises the power grid, and wherein the controller is configured to activate the air conveying apparatus if it is determined that the at least one battery is being charged.

4. The vehicle ambient air purification arrangement according to claim 1 wherein the controller is connectable to an electric hybrid system comprising:
   at least one of a solar power generator arranged to convert solar energy into electrical energy or a wind power generator arranged to convert wind energy into electrical energy; and
   at least one battery that is chargeable via the at least one of the solar power generator or the wind power generator;
   wherein the controller is configured to activate the air conveying apparatus if it is determined that the at least one battery is being charged, and wherein the electricity supply source comprises the at least one of the solar power generator or the wind power generator.

5. The vehicle ambient air arrangement according to claim 1 wherein the ventilation system further comprises at least one air intake, and the one or more filters include a particulate filter arranged between the at least one air intake and the air outlet, wherein the air conveying apparatus is arrangeable between the at least one air intake and the air outlet, and the controller is configured to control the air conveying apparatus to convey the ambient air through the ventilation system, from the at least one air intake to the air outlet, through the particulate filter, and wherein the particulate filter is configured to collect at least a part of the particles in the ambient air when the ambient air is conveyed through the particulate filter.

6. The vehicle ambient air arrangement according to claim 5 wherein the ambient air purification arrangement further comprises regeneration means configured to regenerate the particulate filter, to reduce particulates in the particulate filter, by at least one of:
   heat regeneration,
   electrical regeneration,
   UV-light regeneration.

7. The vehicle ambient air arrangement according to claim 5 further comprising a dedicated particle separator arrangeable between the at least one air intake and the one or more filters and configured to separate particles from the ambient air before the ambient air reaches the one or more filters.

8. The vehicle ambient air purification arrangement according to claim 1 further comprising a valve arrangeable after the one or more filters, wherein the controller is further configured to selectively control the valve to let the ambient air flow from the one or more filters to:
   the host vehicle passenger compartment, or
   to a duct which is arranged to bypass the host vehicle passenger compartment.

9. A vehicle comprising:
   an engine;
   a passenger compartment;
   a ventilation system having one or more ducts and one or more filters therein for purification of ambient air that flows to the passenger compartment, as well as ambient air that flows to the host vehicle without entering the passenger compartment, the ventilation system further including an air outlet for allowing air to pass from the vehicle; and an ambient air purification arrangement including an air conveying apparatus, a particulate detector configured to detect amount of particulates in ambient air, and a controller to activate the air conveying apparatus to convey ambient air through the one or more ducts and the one or more filters of the ventilation system in response to a determination that 1) the engine is inoperative, 2) a voltage supplied to the arrangement from an electricity supply source exceeds a threshold voltage, and 3) the detected amount of particulates in the ambient air exceeds a threshold amount of particulates, so that the one or more filters may remove particulates from the ambient air and so that the ambient air may be lead out of the vehicle through the air outlet without first passing through the passenger compartment.

10. The vehicle according to claim 9 wherein the controller further is configured to determine if the electricity supply source is a power grid, and to activate the air conveying apparatus if it is determined that the arrangement is connected to the power grid.

11. The vehicle according to claim 9 wherein the controller is connected to an electric hybrid system comprising at least one battery that is chargeable via a power grid, wherein the electricity supply source comprises the power grid, and wherein the controller is configured to activate the air conveying apparatus if it is determined that the at least one battery is being charged.

12. The vehicle according to claim 9 wherein the controller is connectable to an electric hybrid system comprising:
at least one of a solar power generator arranged to convert solar energy into electrical energy or a wind power generator arranged to convert wind energy into electrical energy; and
at least one battery that is chargeable via the at least one of the solar power generator or the wind power generator;
wherein the controller is configured to activate the air conveying apparatus if it is determined that the at least one battery is being charged, and wherein the electricity supply source comprises the at least one of the solar power generator or the wind power generator.

13. The vehicle according to claim 9 wherein the ventilation system further comprises at least one air intake, and the one or more filters include a particulate filter arranged between the at least one air intake and the air outlet, wherein the air conveying apparatus is also arranged between the at least one air intake and the air outlet, and the controller is arranged to control the air conveying apparatus to convey the ambient air through the ventilation system, from the at least one air intake to the air outlet, through the particulate filter, and wherein the particulate filter is configured to collect at least a part of the particles in the ambient air when the ambient air is conveyed through the particulate filter.

14. The vehicle according to claim 13 wherein the ambient air purification arrangement further comprises a dedicated particle separator arranged between the at least one air intake and the one or more filters and configured to separate particles from the ambient air before the ambient air reaches the one or more filters.

15. The vehicle according to claim 13 wherein the ambient air purification arrangement further comprises regeneration means configured to regenerate the particulate filter, to reduce particulates in the particulate filter, by at least one of:

heat regeneration,
electrical regeneration,
UV-light regeneration.

16. The vehicle according to claim 9 wherein the ambient air purification arrangement further comprises a valve arranged downstream of the one or more filters, and wherein the controller is further configured to selectively control the valve to let the ambient air flow from the one or more filters to:
the host vehicle passenger compartment, or
to a duct which is arranged to bypass the host vehicle passenger compartment.

17. A vehicle fleet comprising a plurality of vehicles according to claim 9, wherein the vehicles are configured to clean air that is ambient to the vehicles.

18. The vehicle according to claim 9 wherein the ventilation system is arranged so that the ambient air may pass through the one or more filters and be led out of the vehicle through the air outlet without passing underneath the passenger compartment.

19. A method for purifying ambient air by a vehicle ambient air purification arrangement in a host vehicle, wherein the host vehicle further comprises an engine and a ventilation system having ducts and one or more filters therein for purification of ambient air that flows to a passenger compartment of the host vehicle, as well as ambient air that flows to the host vehicle without entering the passenger compartment, wherein the ventilation system further includes an air outlet for allowing air to pass from the vehicle, and wherein the arrangement comprises an air conveying apparatus and a controller, the method comprising:
determining, by the controller, that the engine is inoperative;
determining, by the controller, that a voltage supplied to the arrangement from an electricity supply source exceeds a threshold voltage;
detecting amount of particulates in ambient air;
activating the air conveying apparatus to convey ambient air through the ducts and the one or more filters of the ventilation system in response to a determination that 1) the engine is inoperative, 2) the voltage supplied to the arrangement exceeds a threshold voltage, and 3) the detected amount of particulates in the ambient air exceeds a threshold amount of particulates, so that the one or more filters remove particulates from the ambient air and so that the ambient air is lead out of the vehicle through the air outlet without first passing through the passenger compartment.

20. The method according to claim 19 further comprising determining, by the controller, if the electricity supply source is a power grid, and activating the air conveying apparatus if it is determined that the arrangement is connected to the power grid.

21. The method according to claim 19 wherein the controller is connectable to an electric hybrid system comprising:
at least one of a solar power generator arranged to convert solar energy into electrical energy or a wind power generator arranged to convert wind energy into electrical energy; and
at least one battery that is chargeable via the at least one of the solar power generator or the wind power generator;
wherein the method comprises activating the air conveying apparatus, by the controller, if it is determined that the at least one battery is being charged, and wherein the electricity supply source comprises the at least one of the solar power generator or the wind power generator.

\* \* \* \* \*

UNITED STATES PATENT AND TRADEMARK OFFICE
CERTIFICATE OF CORRECTION

PATENT NO.        : 10,682,895 B2
APPLICATION NO.   : 14/666974
DATED             : June 16, 2020
INVENTOR(S)       : Hans Mathiasson et al.

Page 1 of 1

It is certified that error appears in the above-identified patent and that said Letters Patent is hereby corrected as shown below:

Column 11, Lines 16-17, Claim 9:
After "so that the ambient air may be"
Delete "lead" and
Insert -- led --.

Column 12, Line 47, Claim 19:
After "so that the ambient air is"
Delete "lead" and
Insert -- led --.

Signed and Sealed this
Sixth Day of October, 2020

Andrei Iancu
*Director of the United States Patent and Trademark Office*